(12) United States Patent
Maienschein

(10) Patent No.: US 10,054,191 B2
(45) Date of Patent: Aug. 21, 2018

(54) CENTRIFUGAL PENDULUM WITH CLAMPING DEVICE

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 22 days.

(21) Appl. No.: 15/303,649

(22) PCT Filed: Mar. 31, 2015

(86) PCT No.: PCT/DE2015/200225
§ 371 (c)(1),
(2) Date: Oct. 12, 2016

(87) PCT Pub. No.: WO2015/161847
PCT Pub. Date: Oct. 29, 2015

(65) Prior Publication Data
US 2017/0030430 A1 Feb. 2, 2017

(30) Foreign Application Priority Data

Apr. 23, 2014 (DE) .................. 10 2014 207 609

(51) Int. Cl.
*F16F 15/14* (2006.01)
*F16F 15/12* (2006.01)
*F16F 15/121* (2006.01)

(52) U.S. Cl.
CPC .......... *F16F 15/145* (2013.01); *F16F 15/121* (2013.01); *F16F 2226/04* (2013.01)

(58) Field of Classification Search
CPC .. F16F 15/121; F16F 15/1212; F16F 15/1213; F16F 15/12313; F16F 15/1232;
(Continued)

(56) References Cited

U.S. PATENT DOCUMENTS 6,168,525 B1* 1/2001 Hanke ............... F16F 15/13476
464/27
6,193,611 B1* 2/2001 Hanke ....................... F16D 3/80
192/208
(Continued)

FOREIGN PATENT DOCUMENTS

DE 10224874 A1 12/2002
DE 102009037481 A1 3/2010
(Continued)

*Primary Examiner* — Adam D Rogers

(57) ABSTRACT

A centrifugal pendulum supportable for rotation about an axis of rotation, including a pendulum flange, a pendulum mass, and a cam guide. The pendulum mass includes a first pendulum mass part and a second pendulum mass part. The first and second pendulum mass parts are coupled to be jointly movable with the pendulum flange along a pendulum path to a limited extent. A locking device is provided, the locking device coupling the first pendulum mass part and the second pendulum mass part. The locking device is capable of locking the first pendulum mass part relative to the second pendulum mass part.

20 Claims, 2 Drawing Sheets

(58) Field of Classification Search
CPC .. F16F 15/13469; F16F 15/14; F16F 15/1414;
F16F 15/1421; F16F 15/145; F16F
2226/04
See application file for complete search history.

(56) References Cited

U.S. PATENT DOCUMENTS

| | | | |
|---|---|---|---|
| 9,328,796 B2* | 5/2016 | Movlazada | F16F 15/145 |
| 2016/0153521 A1* | 6/2016 | Tondellier | F16F 15/145 74/574.2 |
| 2016/0333961 A1* | 11/2016 | Dinger | F16F 15/145 |
| 2017/0102045 A1* | 4/2017 | Krause | F16F 15/145 |
| 2017/0108078 A1* | 4/2017 | Dinger | F16F 15/145 |
| 2017/0146090 A1* | 5/2017 | Dinger | F16F 15/145 |
| 2017/0175850 A1* | 6/2017 | Maienschein | F16F 15/13469 |

FOREIGN PATENT DOCUMENTS

| | | | | |
|---|---|---|---|---|
| DE | 102011012606 A1 | | 9/2011 | |
| DE | 102011087693 A1 | | 6/2012 | |
| DE | 102014207229 A1 | * | 11/2014 | ............ F16F 15/145 |
| JP | 2015113877 A | * | 6/2015 | |
| WO | 2014005907 A1 | | 1/2014 | |
| WO | WO-2014005907 A1 | * | 1/2014 | ............ F16F 15/145 |

* cited by examiner

CENTRIFUGAL PENDULUM WITH CLAMPING DEVICE

CROSS-REFERENCE TO RELATED APPLICATION

The present application is the U.S. national stage application pursuant to 35 U.S.C. § 371 of International Application No. PCT/DE2015/200225, filed Mar. 31, 2015, which application claims priority from German Patent Application No. DE 10 2014 207 609.9, filed Apr. 23, 2014, which applications are incorporated herein by reference in their entireties.

TECHNICAL FIELD

The present disclosure relates to a centrifugal pendulum.

BACKGROUND

Centrifugal pendulums having a pendulum mass, a pendulum flange, and a cam guide are known in the art. The cam guide couples the pendulum mass and the pendulum flange and guides the pendulum mass along a pendulum path when torsional vibration is introduced into the centrifugal pendulum. However, a disadvantage is that when a reciprocating engine in the drive train is switched off, the pendulum mass in the cam guide hits the end stops and thus creates clacking sounds.

SUMMARY

In accordance with the present disclosure, it has been found that an improved centrifugal pendulum is provided in that the centrifugal pendulum is supportable for rotation about an axis of rotation and includes a pendulum flange, a pendulum mass, and a cam guide. The pendulum mass parts are jointly coupled to the pendulum flange by means of the cam guide in a way to be movable to a limited extent along a pendulum path, and a locking device is provided, the locking device coupling the first pendulum mass part and the second pendulum mass part and the locking device suitable for locking the first pendulum mass part relative to the second pendulum mass part.

Thus, below a predefined threshold rotational speed, the locking device may lock the two pendulum mass parts relative to the cam guide, preventing the pendulum mass from dropping into the end stops of the cam guide and creating clacking sounds below the threshold rotational speed. This enables the provision of a particularly low-noise centrifugal pendulum that is especially wear-resistant.

It is advantageous if the locking device includes a first recess in the first pendulum mass part and a second recess in the second pendulum mass part. The two recesses are disposed at least partly to overlap, and the locking device includes a spring component that is at least partly disposed in the first and second recesses.

It is particularly advantageous if the first recess and/or the second recess are disposed at least partly to extend in a circumferential direction. It is particularly advantageous if the first and/or second recess have a circumferential configuration shaped like a subring, for example, have an arcuate shape.

In an example embodiment, the pendulum flange has a first pendulum flange part and a second pendulum flange part at least partially spaced apart from the first pendulum flange part in an axial direction. The pendulum mass and the locking device are disposed axially between the two pendulum flange parts. Thus, an especially compact centrifugal pendulum is provided that is in particular very easy to integrate in a torsional vibration damper.

It is furthermore advantageous if the spring component includes a first longitudinal end and a second longitudinal end. Below a predefined threshold rotational speed, the first longitudinal end of the spring component rests against a first end face of the first recess and the second longitudinal end of the spring component rests against a second end face of the second recess, the second end face disposed opposite the first end face in a circumferential direction In an example embodiment, the cam guide includes a first recess disposed in the pendulum flange, a second recess disposed in the first pendulum mass part, and a third recess disposed in the second pendulum mass part. The cam guide includes a guide element. The guide element passes through the recesses. Above a predefined threshold rotational speed, the second recess and the third recess overlap. This ensures that above the threshold rotational speed, the pendulum mass parts jointly oscillate in synchronism along the pendulum path and are thus capable of absorbing torsional vibration coming from the reciprocating engine.

In an example embodiment, the first recess includes a first recess outline, the second recess includes a second recess contour, and the third recess includes a third recess contour. Below the threshold rotational speed, the locking device presses at least the second and third recess contours. In an example embodiment, below the threshold rotational speed, the locking device presses the first recess contour circumferentially against the guide element. Thus, a position of the pendulum mass parts and of the guide element relative to the pendulum flange is fixed in a defined way.

It is advantageous if below a predefined threshold rotational speed, the pendulum mass parts are disposed to be circumferentially offset relative to one another and above the threshold rotational speed, the pendulum mass parts are disposed to essentially overlap.

It is advantageous if the spring component is screw-shaped and/or has an arcuate shape.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
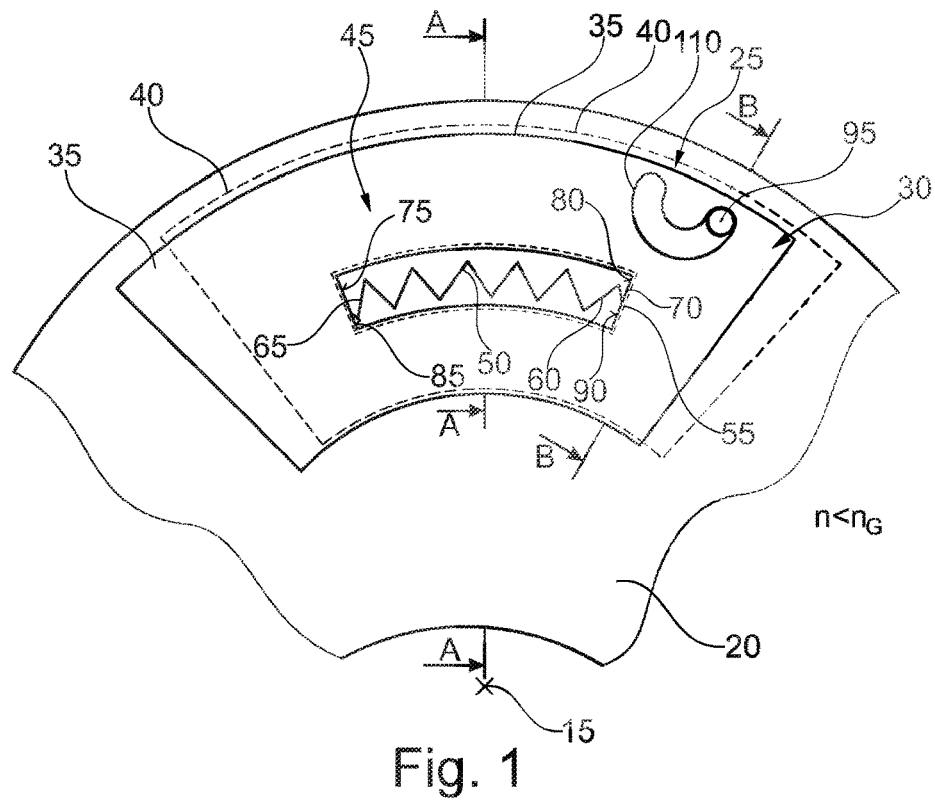
FIG. 1 is an axial view of a section of a centrifugal pendulum in a first operating condition with a pendulum flange removed.

FIG. 1 is an axial view of a section of centrifugal pendulum 10 in a first operating condition. Centrifugal pendulum 10 may be part of a drive train of a motor vehicle and is capable of at least partially absorbing torsional vibration coming from a reciprocating engine in a drive train.

In a first operating condition, centrifugal pendulum 10 is at a standstill or rotates about axis of rotation 15 at rotational speed n that is lower than threshold rotational speed $n_G$. Centrifugal pendulum 10 includes pendulum flange 20, pendulum mass 25, and cam guide 30. Pendulum mass 25 is coupled to pendulum flange 20 by means of cam guide 30. Cam guide 30 guides pendulum mass 25 in an oscillating movement along a pendulum path so that pendulum mass 25 is movable relative to pendulum flange 20 to a limited extent. Pendulum mass 25 includes pendulum mass part 35 and pendulum mass part 40. For a better understanding, pendulum mass part 35 is indicated by a continuous line and pendulum mass part 40 is indicated by a dashed line in FIG. 1.

In addition, locking device 45 is provided. Locking device 45 includes recess 50 (indicated by a continuous line in FIG. 1) disposed in pendulum mass part 35 and recess 55 (indicated by a dashed line in FIG. 1) disposed in pendulum mass part 40. In terms of axis of rotation 15, recesses 50, 55 are disposed to be circumferentially offset relative to one another in pendulum mass parts 35, 40. The outer circumferential geometry of pendulum mass parts 35, 40 is identical. In the first operating condition, recesses 50, 55 are disposed to overlap axially, that is in a direction parallel to axis 15. In the view of FIG. 1, recesses 50, 55 are shaped like respective subrings, for example have arcuate shapes. In the circumferential direction, recesses 50, 55 extend tangentially with respect to axis of rotation 15. Recesses 50, 55 may of course be designed in a different way. However, an essential aspect is that recesses 50, 55 at least partly extend in a circumferential direction.

Locking device 45 further includes spring component 60. Spring component 60 extends essentially tangentially to the axis of rotation. Spring component 60 has longitudinal end 65 and longitudinal end 70 disposed to be opposite first longitudinal end 65 as viewed in the circumferential direction. Recess 50 has end face 75 disposed on the left in FIG. 1. Recess 55 has end face 80 disposed on the right in FIG. 1. Recess 55 further has end face 85 disposed on the left in FIG. 1 and recess 50 has end face 90 disposed on the right of spring component 60.

Figure 4:
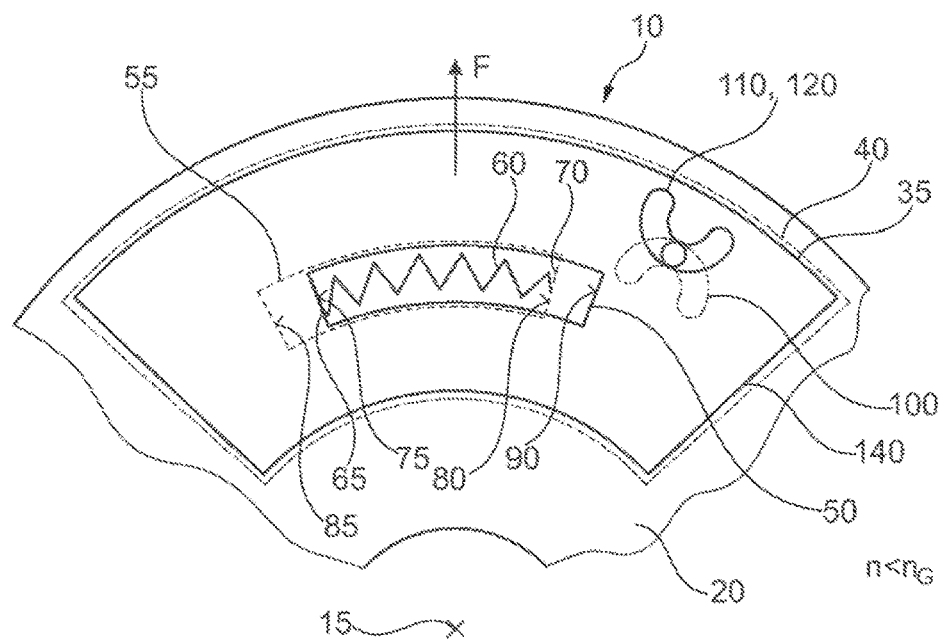
FIG. 4 is an axial view of the section of the centrifugal pendulum shown in FIG. 1 in a second operating condition.

Cam guide 30 includes guide element 95. In the illustrated example embodiment, guide element 95 is embodied as a pendulum roller. It is to be understood that guide element 95 may be of a different design. Cam guide 30 further includes cutout 100 disposed in pendulum flange 20. Cutout 100 has cutout contour 105 as seen in FIG. 4. Cutout contour 105 is, in an example embodiment, kidney-shaped and has a center of curvature that is disposed radially inward relative to cutout 100. It is to be understood that cutout 100 may be of a different design. Cam guide 30 further includes cutout 110 (shown in FIGS. 1 and 4) disposed in pendulum mass part 35 and having cutout contour 115. Cam guide 30 further has cutout 120 (shown in FIG. 4) disposed in pendulum mass part 40 and having cutout contour 125. In an example embodiment, cutout contours 115, 125 of cutout 110 and cutout 120 are likewise kidney-shaped, but with centers of curvature disposed radially outward of cutout 110, 120, respectively. Cutout 110 and cutout 120 are disposed in identical positions in respective pendulum mass part 35, 40 and have identical cutout contours 115, 125.

Guide element 95 passes through cutouts 100, 110, 120. Together with the geometric design of guide element 95, cutout contours 105, 115, 125 define a pendulum path of pendulum mass 25 along which pendulum mass 25 oscillates when torsional vibration is introduced into centrifugal pendulum 10.

The provision of the locking device 45 described above enables pendulum mass parts 35, 40 to move relative to one another in a circumferential direction over a predefined angle of movement. The freedom of movement is defined by the design of cutout contours 105, 115, 125.

Due to the offset between recess 50 and recess 55 in connection with the preload of spring component 60, spring component 60 presses pendulum mass parts 35, 40 away from one another so that recesses 50, 55 overlap and first longitudinal end 65 rests against both end face 75 and end face 85 and longitudinal end 70 rests against end face 80 and end face 90. In addition, cutout contours 105, 115, 125 are circumferentially pressed against guide element 95 so that pendulum mass parts 35, 40 are held in a predefined position in cam guide 30 by locking device 45. An advantage of this feature is that clacking noises that occur when the engine of the drive train is switched off may be avoided because pendulum mass parts 35, 40 are not displaced freely along the pendulum path of the known centrifugal pendulums when the rotational speed drops below threshold speed $n_G$.

Figure 2:
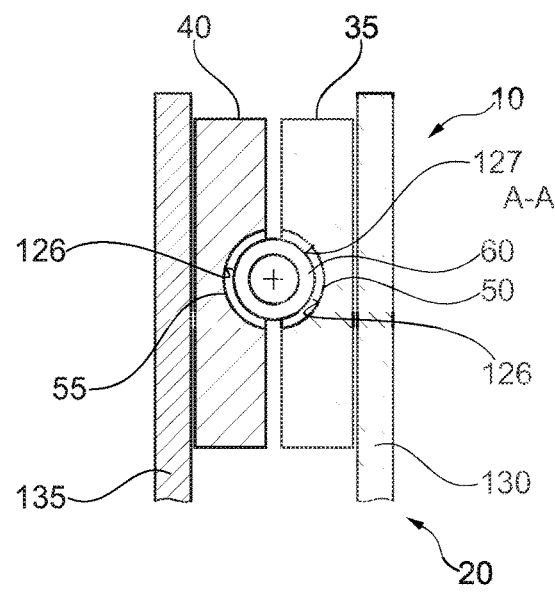
FIG. 2 is a cross-sectional view of the centrifugal pendulum taken along sectional plane A-A shown in FIG. 1.
Figure 3:
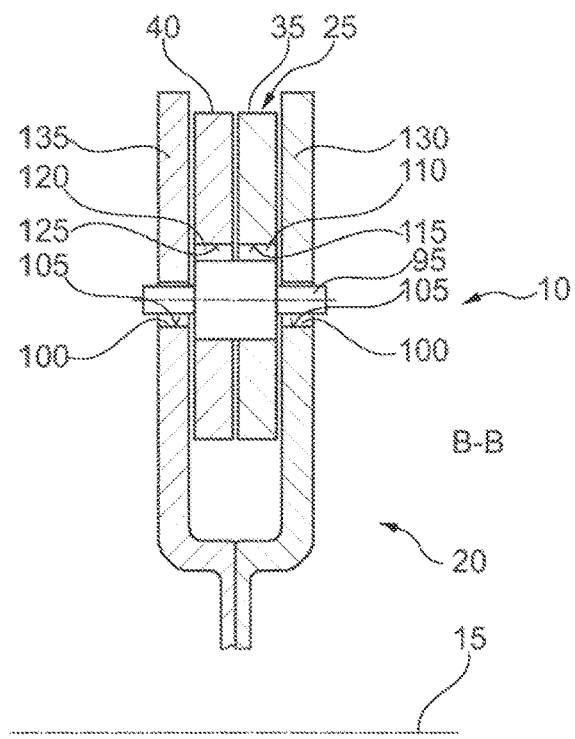
FIG. 3 is a cross-sectional view of the centrifugal pendulum taken along a sectional plane B-B shown in FIG. 1.

FIG. 2 is a cross-sectional view of centrifugal pendulum 10 shown in FIG. 1 taken along a cutting plane A-A shown in FIG. 1. FIG. 3 is a cross-sectional view of centrifugal pendulum 10 shown in FIG. 1 along a cutting plane B-B shown in FIG. 1.

Recesses 50, 55 (see FIG. 2) circumferentially surround spring component 60 essentially in its entirety. Recesses 50, 55 have a cup-like design with inner recess surface 126 formed to correspond to outer circumferential surface 127 of spring component 60. It is to be understood that recesses 50, 55 may have a different design. Thus, if pendulum mass parts 35, 40 are manufactured in a stamping/bending process, it is likewise conceivable for recesses 50, 55 to be formed with lug elements, the lug elements fixing spring component 60 in recesses 50, 55.

Pendulum flange 20 has pendulum flange part 130 and pendulum flange part 135 axially spaced apart from pendulum flange part 130 in the region of pendulum mass 25. Pendulum mass 25 is disposed axially between pendulum flange parts 130, 135. Cutout 100 is provided in each one of pendulum flange parts 130, 135. Radially inward of pendulum mass 25, pendulum flange parts 130, 135 may be axially adjacent to one another as shown in FIG. 3. This provides a particularly compact centrifugal pendulum 10.

FIG. 4 is an axial view of a section of centrifugal pendulum 10 shown in FIG. 1 in a second operating condition. In the second operating condition, centrifugal pendulum 10 rotates at rotational speed n greater than threshold speed $n_G$. In the rotating condition, centrifugal force F acts on pendulum mass parts 35, 40. Centrifugal force F causes: pendulum mass parts 35, 40 to be pulled radially outwards; cutout contours 115, 125 to be placed radially on the inside against guide element 95; and guide element 95 to be placed radially on the outside against cutout contour 105. In addition, centrifugal force F pulls pendulum masses 35, 40 into a pendulum position in which cutout 110 and cutout 120 axially overlap. Pendulum mass parts 35, 40 attain this position as centrifugal force F additionally moves pendulum mass parts 35, 40 relative to one another and locks spring component 60 in recesses 50, 55.

Compared to the first operating condition, longitudinal end 65 of spring component 60 is then placed exclusively against end face 75 and longitudinal end 70 of spring component 60 is placed exclusively against end face 80. In this process, spring component 60 is compressed in the circumferential direction. In an example identical embodiment of outer contour 140 of pendulum mass parts 35, 40, outer contour 140 of pendulum mass part 35 likewise overlaps outer contour 140 of pendulum mass part 40.

When pendulum mass parts 35, 40 assume the pendulum position above threshold rotational speed $n_G$, pendulum mass parts 35, 40 jointly act as one pendulum mass 25 and oscillate along the pendulum path predefined by cam guide 30 when torsional vibration is introduced into centrifugal pendulum 10. This allows the torsional vibration to be absorbed by pendulum mass 25. When the engine is switched off and rotational speed n of centrifugal pendulum 10 drops below threshold rotational speed $n_G$, centrifugal force F acting on pendulum mass parts 35, 40 likewise decreases, allowing spring component 60 to push pendulum mass parts 35, 40 away from another in a circumferential direction and thus cancels the pendulum position of pendulum mass parts 35, 40. Pendulum mass parts 35, 40 then lock relative to cam guide 30 as described above. This prevents pendulum mass parts 35, 40 from hitting the end positions of cam guide 30 and from creating clacking noises when the engine is switched off. This provides an especially low-noise centrifugal pendulum 10. Furthermore, additional elastomer dampers for reducing the impact noises may be dispensed with when using the embodiment described above. This is advantageous in particular because a release of particles from an elastomer damper may be avoided.

It is to be understood that other elements capable of pressing pendulum mass parts 35, 40 against one another in a circumferential direction may be used instead of spring component 60 shown in the example embodiment of FIGS. 1 through 4. Furthermore it is possible for locking device 35 to be designed in such a way that locking device 35 at least partly presses pendulum mass parts 35, 40 into the pendulum path.

A particular advantage of the embodiment described above is that if an automatic transmission, including a converter clutch, is provided in the drive train, quick turbine accelerations/decelerations are reduced by locking device 45, reducing the stress in centrifugal pendulum 10 in shifting operations, e.g. a shifting operation from drive (D) to neutral (N) or from neutral (N) to drive (D). Furthermore the operational noises of centrifugal pendulum 10 on the whole are minimized.

It is pointed out that the example embodiment of the centrifugal pendulum described above is not limited to centrifugal pendulum 10 wherein pendulum mass 25 is disposed between pendulum mass parts 35, 40. It is to be understood that locking device 45 described above may also couple pendulum mass parts 35, 40 disposed on respective sides of pendulum flange 20 and may lock pendulum parts 35 and 40 relative to cam guide 30.

LIST OF REFERENCE SYMBOLS

10 centrifugal pendulum
15 axis of rotation
20 pendulum flange
25 pendulum mass
30 cam guide
35 pendulum mass part
40 pendulum mass part
45 locking device
50 recess
55 recess
60 spring component
65 longitudinal end of the spring component
70 longitudinal end of the spring component
75 end face
80 end face
85 end face
90 end-face
95 guide element
100 cutout
105 cutout contour
110 cutout
115 cutout contour
120 cutout
125 cutout contour
126 recess surface
127 outer circumferential surface of the spring component
130 pendulum flange part
135 pendulum flange part
140 outer contour

The invention claimed is:

1. A centrifugal pendulum, comprising:
a first pendulum flange including a cutout;
an axis of rotation of the first pendulum flange;
a first pendulum mass including a cutout;
a second pendulum mass including a cutout;
a guide element passing through and displaceable within the respective cutouts of the first pendulum flange, the first pendulum mass, and the second pendulum mass; and
a locking device:
coupling the first and second pendulum masses; and
urging the first pendulum mass into a fixed position with respect to the second pendulum mass.

2. The centrifugal pendulum of claim 1, wherein:
the locking device comprises a first recess and a second recess;
the first recess is formed in the first pendulum mass;
the second recess is formed in the second pendulum mass;
at least a portion of the first recess of the first pendulum mass overlaps, in an axial direction parallel to the axis of rotation, the second recess of the second pendulum mass; and
the locking device includes a spring component disposed, at least in part, in the first recess of the first pendulum mass and in the second recess of the second pendulum mass.

3. The centrifugal pendulum of claim 2, wherein:
the first recess of the first pendulum mass includes a first circumferential end and a second circumferential end;
the second recess of the second pendulum mass includes a first circumferential end and a second circumferential end;
the spring component includes a first circumferential end and a second circumferential end; and
for a speed of rotation of the centrifugal pendulum below a threshold speed:
the first circumferential end of the spring component presses the first circumferential end of the first pendulum mass and the first circumferential end of the second pendulum mass; and
the second circumferential end of the spring component presses the second circumferential end of the first pendulum mass and the second circumferential end of the second pendulum mass.

4. The centrifugal pendulum of claim 3, wherein:
for the speed of rotation of the centrifugal pendulum below the threshold speed, the first pendulum mass and the second pendulum mass are offset, by a first amount, in a circumferential direction; and
for the speed of rotation of the centrifugal pendulum above the threshold speed, the first pendulum mass and the second pendulum mass:

are offset, by a second amount, less than the first amount, in the circumferential direction; or the first pendulum mass overlaps the second pendulum mass in the axial direction.

5. The centrifugal pendulum of claim 3, wherein:
the cutout of the first pendulum mass and the cutout of the second pendulum mass include respective contours; and for the speed of rotation of the centrifugal pendulum below the threshold speed, the spring component presses the respective contours into contact with the guide element.

6. The centrifugal pendulum of claim 5, wherein:
the cutout of the first pendulum flange includes a contour; and for the speed of rotation of the centrifugal pendulum below the threshold speed, the spring component presses the contour of the first pendulum flange into contact with the guide element.

7. The centrifugal pendulum of claim 2, wherein:
the first recess of the first pendulum mass includes a first circumferential end and a second circumferential end;
the second recess of the second pendulum mass includes a first circumferential end and a second circumferential end;
the spring component includes a first circumferential end and a second circumferential end; and
for a speed of rotation of the centrifugal pendulum above a threshold speed:
the first circumferential end of the spring component:
presses the first circumferential end of the first pendulum mass; and
is free of engagement with the first circumferential end of the second pendulum mass; and
the second circumferential end of the spring component:
presses the second circumferential end of the second pendulum mass; and
is free of engagement with the second circumferential end of the first pendulum mass.

8. The centrifugal pendulum of claim 7, wherein:
for the speed of rotation of the centrifugal pendulum above the threshold speed, the first pendulum mass and the second pendulum mass are offset, by a first amount, in a circumferential direction; and for the speed of rotation of the centrifugal pendulum below the threshold speed, the first pendulum mass and the second pendulum mass are offset, by a second amount, greater than the first amount, in the circumferential direction.

9. The centrifugal pendulum of claim 7, wherein for the speed of rotation of the centrifugal pendulum above the threshold speed, the first pendulum mass and the second pendulum mass are displaceable, in unison, with respect to the first pendulum flange.

10. The centrifugal pendulum of claim 2, wherein:
the first recess of the first pendulum mass has a first arcuate shape in a circumferential direction; and
the second recess of the second pendulum mass has a second arcuate shape in the circumferential direction.

11. The centrifugal pendulum of claim 1, further comprising:
a second pendulum flange with a cutout, wherein:
the guide element is disposed within and displaceable within the cutout of the second pendulum flange; and
the first pendulum mass and the second pendulum mass are disposed, in an axial direction parallel to the axis of rotation, between the first pendulum flange and the second pendulum flange.

12. A method of damping vibration using a centrifugal pendulum including a pendulum flange, a first pendulum mass, and a second pendulum mass, the method comprising:
disposing a guide element within a cutout of the pendulum flange, a cutout of the first pendulum mass, and a cutout of the second pendulum mass;
coupling the first pendulum mass and the second pendulum mass with a locking element disposed, at least in part, in a first recess in the first pendulum mass and in a second recess in the second pendulum mass; and
pressing, with the locking element, the first pendulum mass and the second pendulum mass.

13. The method of claim 12, wherein:
the locking element includes a spring component with a first circumferential end and a second circumferential end; and
pressing, with the locking element, the first pendulum mass and the second pendulum mass includes:
pressing, with the first circumferential end, the first pendulum mass and the second pendulum mass in a first circumferential direction; and
pressing, with the second circumferential end, the first pendulum mass and the second pendulum mass in a second circumferential direction, opposite the first circumferential direction.

14. The method of claim 13, further comprising:
rotating the centrifugal pendulum at a speed less than a threshold speed; and
pressing, with the spring component, respective contours of the respective cutouts in the first pendulum mass and the second pendulum mass into contact with the guide element.

15. The method of claim 13, further comprising:
rotating the centrifugal pendulum at a speed of rotation below a threshold speed; and
offsetting, with the spring component and in a circumferential direction, the first pendulum mass with respect to the second pendulum mass by a first amount.

16. The method of claim 15, further comprising:
increasing the speed of rotation of the centrifugal pendulum to above the threshold speed; and
decreasing the first amount.

17. The method of claim 15, further comprising:
increasing the speed of rotation of the centrifugal pendulum to above the threshold speed;
circumferentially displacing the first pendulum mass and the second pendulum mass with respect to each other; and
compressing the spring component with the first pendulum mass and the second pendulum mass.

18. The method of claim 15, further comprising:
increasing the speed of rotation of the centrifugal pendulum to above the threshold speed;
pressing the first pendulum mass with the first circumferential end of the spring component;
disengaging the second circumferential end of the spring component from the second pendulum mass;
pressing the second pendulum mass with the second circumferential end of the spring component; and
disengaging the second circumferential end of the spring component from the first pendulum mass.

19. The method of claim 12, wherein the locking element includes a spring component with a first circumferential end and a second circumferential end, the method further comprising:
- rotating the centrifugal pendulum at a speed greater than a threshold speed;
- pressing, with the spring component, respective contours of the respective cutouts in the first pendulum mass and the second pendulum mass into contact with the guide element;
- reducing the speed of rotation of the centrifugal pendulum to below the threshold speed; and
- maintaining, with the spring component, contact between the guide element and the respective contours of the respective cutouts in the first pendulum mass and the second pendulum mass.

20. A centrifugal pendulum, comprising:
- a first pendulum flange including a cutout;
- an axis of rotation of the first pendulum flange;
- a first pendulum mass including a cutout and a recess;
- a second pendulum mass including a cutout and a recess;
- a pendulum roller passing through and displaceable within the cutout of the first pendulum flange, the cutout of the first pendulum mass, and the cutout of the second pendulum mass; and
- a spring component:
  - disposed, at least in part, in the recess of the first pendulum mass and in the recess of the second pendulum mass; and
  - including a first circumferential end and a second circumferential end pressing at least one of the first pendulum mass or the second pendulum mass, wherein:
- for a speed of rotation of the first pendulum flange below a threshold speed, the first pendulum mass and the second pendulum mass are offset, by a first amount, in a circumferential direction; and
- for the speed of rotation of the first pendulum flange above the threshold speed, the first pendulum mass and the second pendulum mass are offset, by a second amount, less than the first amount, in the circumferential direction.

* * * * *